United States Patent [19]
Kiryu et al.

[11] Patent Number: 5,490,070
[45] Date of Patent: Feb. 6, 1996

[54] WHEEL SPEED DETECTING DEVICE FOR VEHICLE

[75] Inventors: Hironobu Kiryu; Tooru Ikeda; Takashi Nishihara; Osamu Yamamoto; Shuji Shiraishi; Ryoji Mori, all of Wako, Japan

[73] Assignee: Honda Giken Kogyo Kabushiki Kaisha, Tokyo, Japan

[21] Appl. No.: 12,141

[22] Filed: Feb. 1, 1993

[30] Foreign Application Priority Data

Jan. 30, 1992 [JP] Japan .................. 4-015365
Jan. 30, 1992 [JP] Japan .................. 4-015366

[51] Int. Cl.⁶ .................................. B60T 8/66
[52] U.S. Cl. ............. 364/426.02; 364/565; 180/197; 303/147
[58] Field of Search ................ 364/426.02, 426.03, 364/424.05, 565; 324/160, 161, 162, 166; 180/197; 303/95, 100, 103, 105

[56] References Cited

U.S. PATENT DOCUMENTS

| | | | |
|---|---|---|---|
| 4,898,431 | 2/1990 | Karnopp et al. | 303/100 |
| 4,970,650 | 11/1990 | Hashiguchi et al. | 303/103 |
| 5,140,524 | 8/1992 | Matsuda | 364/426.02 |
| 5,157,611 | 10/1992 | Ikeda et al. | 364/426.02 |
| 5,179,526 | 1/1993 | Zimmer et al. | 364/565 |
| 5,238,081 | 8/1993 | Maeda et al. | 364/426.02 |
| 5,270,933 | 12/1993 | Fennel et al. | 364/426.02 |
| 5,287,941 | 2/1994 | Matsuda et al. | 364/426.03 |
| 5,292,184 | 3/1994 | Takata | 364/426.02 |
| 5,299,131 | 3/1994 | Haas et al. | 364/565 |
| 5,313,391 | 5/1994 | Sigl et al. | 364/426.03 |

FOREIGN PATENT DOCUMENTS

| | | |
|---|---|---|
| 2242949 | 10/1991 | United Kingdom . |
| WO89/04782 | 6/1989 | WIPO . |
| WO90/09301 | 8/1990 | WIPO . |

*Primary Examiner*—Gary Chin
*Attorney, Agent, or Firm*—Armstrong, Westerman, Hattori, McLeland & Naughton

[57] ABSTRACT

A wheel speed detecting device for a vehicle having wheel speed detectors for detecting left and right wheel speeds, respectively; a turning state detector for detecting the turning state of the vehicle; and a correcting and calculating device for correcting the wheel speeds on the basis of an output from the turning state detector and for calculating a value representative of the left and right wheel speeds on the basis of the corrected wheel speeds. Thus, an error of wheel speeds detected during turning of the vehicle can be compensated for, thereby determining a correct wheel speed.

5 Claims, 9 Drawing Sheets

WHEEL SPEED DETECTING DEVICE FOR VEHICLE

BACKGROUND OF THE INVENTION

1. Field of the Invention

The present invention relates to a wheel speed detecting device for a vehicle for calculating wheel speeds such as driven wheel speeds and follower wheel speeds which are required, for example, when a slip rate of wheels is determined, in a traction control system or in an antilock brake system.

2. Description of the Related Art

In a vehicle equipped with a traction control system for preventing the excessive slipping of wheels during starting of the vehicle or during rapid acceleration, or for a vehicle equipped with an antilock brake system for preventing the locking of wheels during braking of the vehicle, a slip rate of the wheels is calculated according to the following expression:

Slip Rate=[(Driven Wheel Speed−Vehicle Speed)/Vehicle Speed]× 100

When the slip rate of the wheels is calculated according to this expression, the conventional wheel speed detecting devices calculate an average value of left and right driven wheel speeds to supply the same as a driven wheel speed, and calculate an average value of left and right follower wheel speeds to supply the same as a vehicle speed (e.g., see Japanese Patent Application Laid-open No.60331/86). There is also a conventionally known wheel speed detecting device in which a larger one of left and right driven-wheel speeds is selected as a driven wheel speed.

In general, during turning of the vehicle, a difference in speed is generated between the driven and follower wheels because the driven and follower wheels describe different loci. Therefore, to calculate the slip rate of the driven wheels, a vehicle speed corresponding to the travelling locus of the driven wheels should be calculated. In the prior art wheel speed detecting device, however, the vehicle speed is calculated from the speeds of the follower wheels describing the locus different from that of the driven wheels during turning of the vehicle and therefore, a correct vehicle speed corresponding to the driven wheel speeds could not be obtained. Particularly, the loci of the driven and follower wheels are largely different from each other during turning of the vehicle at a low speed and hence, a gap between a vehicle speed corresponding to the driven wheel speeds and a calculated vehicle speed tends to be increased.

An inner and outer wheel speed difference is also generated between the left and right wheel speeds during turning of the vehicle. In this case, for example, in the wheel speed detecting device in which a larger one of the left and right driven wheel speeds is selected as the driven wheel speed, the speed of the driven wheel lying on the outer side during turning of the vehicle is selected as the driven wheel speed. On the other hand, when the output from an engine is excessive during turning of the vehicle to cause slipping of the driven wheels, the driven wheel lying on the inner side during the turning and having a small load tends to be slipped due to the action of a differential. As a result, when the slip rate of the driven wheel lying on the inner side is calculated in order to prevent the excessive slipping of this driven wheel lying on the inner side, the speed of the driven wheel lying on the outer side during the turning is selected and hence, a disagreement is produced between a driven wheel speed required for the calculation and a driven wheel speed actually used for the calculation.

SUMMARY OF THE INVENTION

Accordingly, it is an object of the present invention to provide a wheel speed detecting device for a vehicle, which is capable of detecting a correct wheel speed even during turning of the vehicle.

To achieve the above object, according to the present invention, there is provided a wheel speed detecting device for a vehicle, comprising a wheel speed detecting means for detecting left and right wheel speeds, respectively, a turning state detecting means for detecting the turning state of the vehicle, and a correcting and calculating means for correcting the wheel speeds on the basis of an output from the turning state detecting means and for calculating a value representative of the left and right wheel speeds on the basis of the corrected wheel speeds.

With the above construction, an error of the wheel speed detected during turning of the vehicle can be compensated for, thereby determining a correct wheel speed.

The above and other objects, features and advantages of the invention will become apparent from the following description of preferred embodiments, taken in conjunction with the accompanying drawings.

DESCRIPTION OF THE PREFERRED EMBODIMENTS

The present invention will be described by way of preferred embodiments in connection with the accompanying drawings.

FIGS. 1 to 4 illustrate a first embodiment of the present invention applied to a traction control system for a vehicle.

Figure 1:
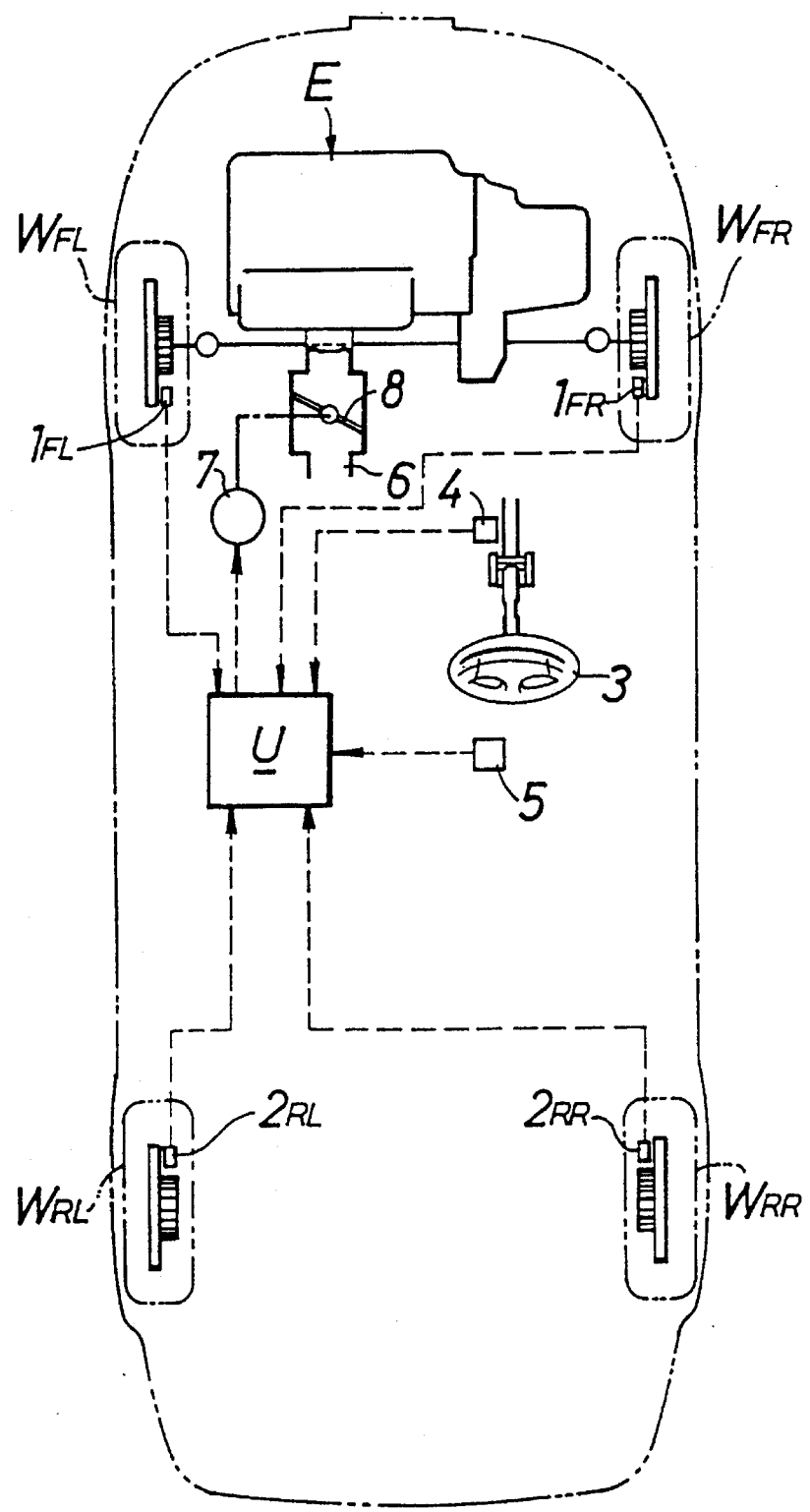
FIG. 1 is a schematic diagram of a construction of a vehicle equipped with a traction control system.

Referring to FIG. 1, the vehicle is a front wheel drive vehicle and includes a pair of left and right driven wheels $W_{FL}$ and $W_{FR}$ driven by an internal combustion engine E, and a pair of left and right follower wheels $W_{RL}$ and $W_{RR}$. Driven-wheel speed detecting means $1_{FL}$ and $1_{FR}$ as a pair of left and right wheel speed detecting means are provided on the driven wheels $W_{FL}$ and $W_{FR}$ for detecting driven-wheel speeds $V_{FL}$ and $V_{FR}$. And follower wheel speed detecting means $2_{RL}$ and $2_{RR}$ as a pair of left and right wheel speed detecting means are provided on the follower wheels $W_{RL}$ and $W_{RR}$ for detecting follower wheel speeds $V_{RL}$ and $V_{RR}$.

A steering angle detecting means 4 is provided on a steering wheel 3 for detecting a steering angle δ. A lateral acceleration detecting means 5 is provided in place on a vehicle body for detecting a lateral acceleration G during turning of the vehicle. The steering angle detecting means 4 and the lateral acceleration detecting means 5 constitute a turning state detecting means for detecting the turning state of the vehicle. A throttle valve 8 is mounted in an intake passage 6 of the internal combustion engine E, and is connected to and opened and closed by a pulse motor 7. The driven-wheel speed detecting means $1_{FL}$ and $1_{FR}$; the follower wheel speed detecting means $2_{RL}$ and $2_{RR}$; the steering angle detecting means 4; the lateral acceleration detecting means 5; and the pulse motor 7 are connected to an electronic control unit U comprising a microcomputer.

Figure 2:
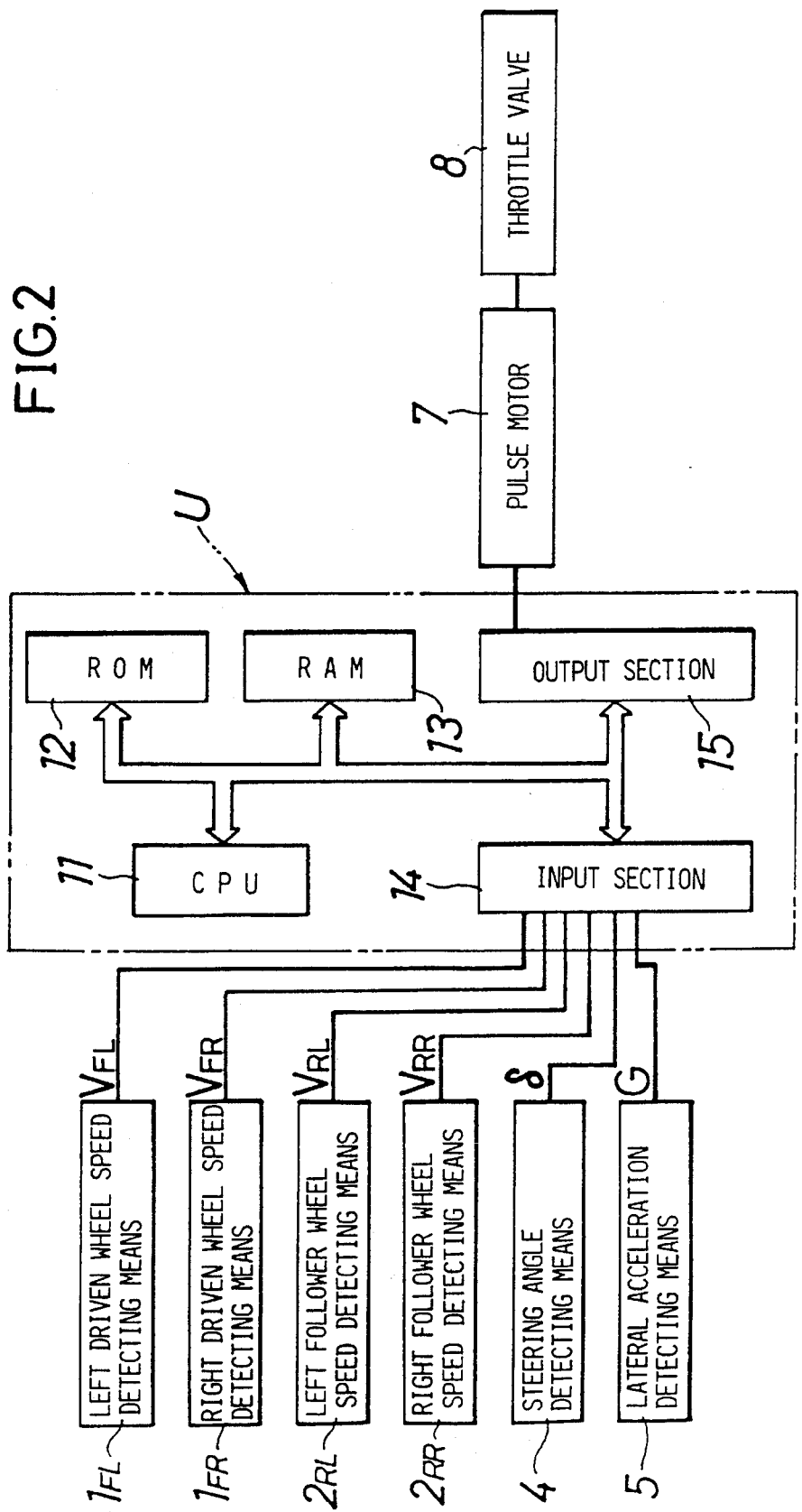
FIG. 2 is a block diagram of the traction control system.

FIG. 2 illustrates the electronic control unit U for controlling the output torque from the internal combustion engine E in order to inhibit the excessive slipping of the driven wheels $W_{FL}$ and $W_{FR}$. The electronic control unit U calculates signals from the above described various detecting means on the basis of a controlling program and controls the driving of the throttle valve 8 through the pulse motor 7. The electronic control unit U is comprised of a central processing unit (CPU) 11 for performing such calculation; a read only memory (ROM) 12 having the above-described controlling program and various data such as tables stored therein; a random access memory (RAM) 13 for temporarily storing the detection signals from the detectors and the calculation results; an input section 14 to which the various detecting means, i.e., the driven-wheel speed detecting means $1_{FL}$ and $1_{FR}$, the follower wheel speed detecting means $2_{RL}$ and $2_{RR}$, the steering angle detecting means 4 and the lateral acceleration detecting means 5 are connected; and an output section 15 to which the pulse motor 7 is connected. The electronic control unit U calculates, in the CPU, various signals inputted through the input section 14 from the data stored in the read only memory 12 on the basis of the controlling program which will be described hereinafter, and finally drives the pulse motor 7 through the output section 15. This causes the throttle valve 8 to be controlled to vary the output torque from the internal combustion engine E, and as a result, the torque of the driven wheels is controlled to an optimal value to inhibit the excessive slipping of the driven wheels $W_{FL}$ and $W_{FR}$.

The circuit for the electronic control unit U will be described below with reference to FIG. 3.

The left and right driven-wheel speeds $V_{FL}$ and $V_{FR}$ detected by the left and right driven-wheel speed detecting means $1_{FL}$ and $1_{FR}$ are inputted into a driven-wheel speed average value calculating means 21, where a driven-wheel speed average value Vw is determined by calculating an average value $(V_{FL}+V_{FR})/2$ of the driven-wheel speeds $V_{FL}$ and $V_{FR}$. The left and right follower wheel speeds $V_{RL}$ and $V_{RR}$ detected by the left and right follower wheel speed detecting means $2_{RL}$ and $2_{RR}$ are inputted into a follower wheel speed average value calculating means 22, where a follower wheel speed average value Vv is determined by calculating an average value $(V_{RL}+V_{RR})/2$ of the follower wheel speeds $V_{RL}$ and $V_{RR}$.

The steering angle δ of the steering wheel 3 detected in the steering angle detecting means 4 and the lateral acceleration G detected in the lateral acceleration detecting means 5 are inputted into a correction value calculating means 23. A correction value ΔVv calculated in the correction value calculating means 23, together with the driven-wheel speed average value Vv calculated in the follower wheel speed average value calculating means 22, is inputted into a vehicle speed calculating means 24. In the vehicle speed calculating means 24, a vehicle speed Vv' is calculated on the basis of the follower wheel speed average value Vv and the correction value ΔVv. Here, the follower wheel speed average value calculating means 22, the correction value calculating means 23 and the vehicle speed calculating means 24 constitute a correcting and calculating means for correcting the wheel speeds and calculating a value representative of the left and right wheel speeds.

Figure 4:
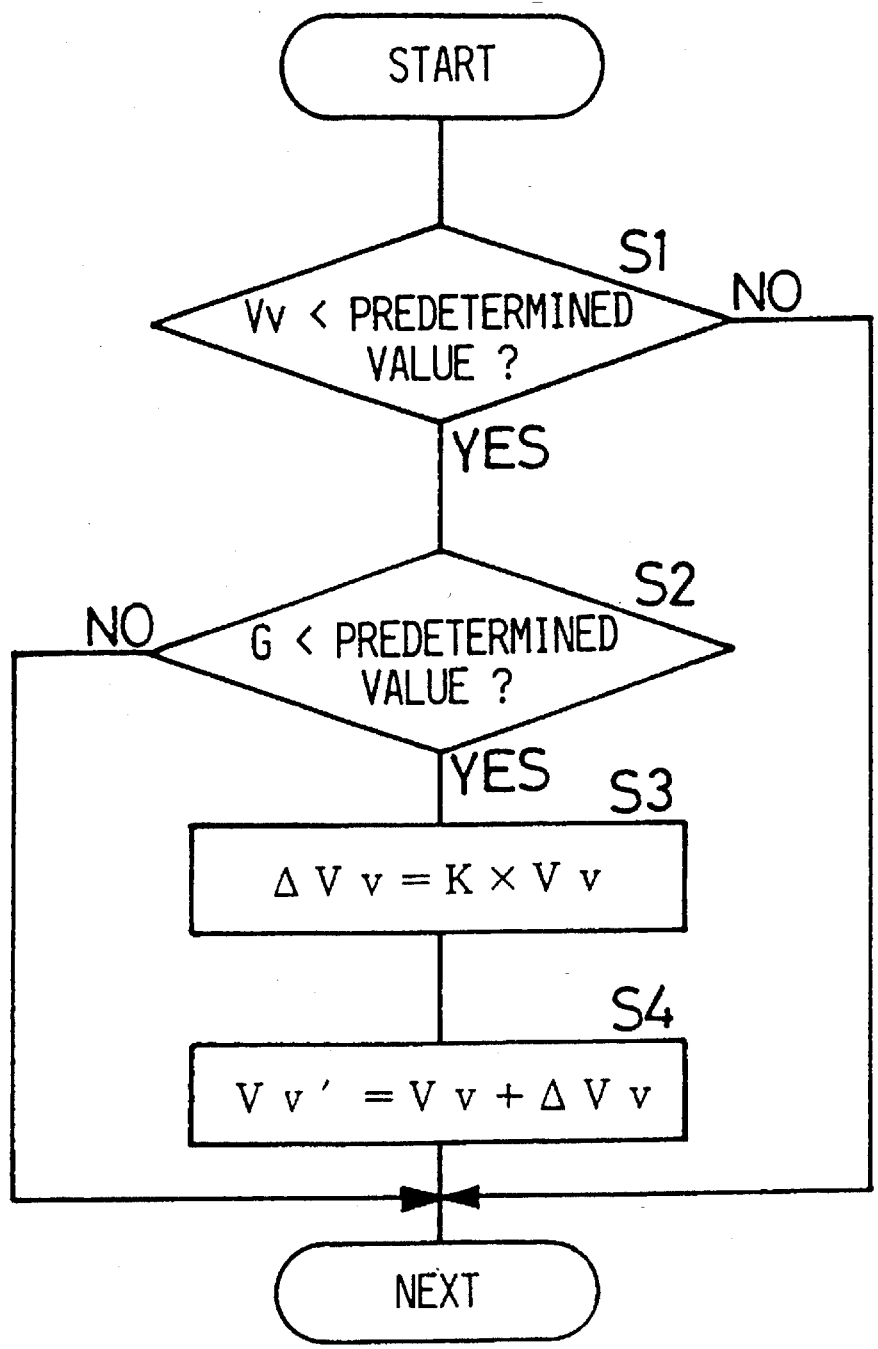
FIG. 4 is a flow chart for detecting a vehicle speed.

The content of a program carried out in the correction value calculating means 23 and the vehicle speed calculating means 24 will be described below with reference to a flow chart shown in FIG. 4.

First, at a step S1, the average value $(V_{RL}+V_{RR})/2$ of the left and right follower wheel speeds $V_{RL}$ and $V_{RR}$ detected by the follower wheel speed detecting means $2_{RL}$ and $2_{RR}$, i.e., the follower wheel speed average value Vv, is compared with a previously set predetermined value (e.g., 60 Km/hr). If the follower wheel speed average value Vv is less than the predetermined value at the step S1, the lateral acceleration G of the vehicle body detected by the lateral acceleration detecting means 5 is compared with a previously set predetermined value (e.g., 0.5 G) at a next step S2. If the lateral acceleration G is less than the predetermined value at the step S2, a correction value ΔVv which is a value corresponding to a difference in speed between the front and rear wheels of the vehicle during turning of the vehicle is determined at a step S3 by multiplying the follower wheel speed average value Vv by a constant K. Here, the constant K is a value searched from a table on the basis of the steering angle δ and the follower wheel speed average value Vv'. Finally, a final vehicle speed Vv which is a value representative of the left and right follower wheel speeds is determined at a step S4 by adding the correction value ΔVv to the follower wheel speed average value Vv.

The processing for determining the vehicle speed Vv' by adding the correction value ΔVv to the follower wheel speed average value Vv in the above manner is carried out, when the follower wheel speed average value Vv is smaller than the predetermined value and the lateral acceleration G is smaller than the predetermined value. This is because the radius of turning of the vehicle is large during travelling of the vehicle at a high speed, so that a difference in speed between the front and rear wheels due to a difference in locus therebetween is small as a proportion with respect to the vehicle speed, and because as the lateral acceleration G is increased, the slip angle of the vehicle body is increased and as a result, the difference in speed between the front and rear wheels due to the difference in locus therebetween is reduced. Thus, during travelling of the vehicle at a low speed and at a low lateral acceleration wherein the difference in speed between the front and rear wheels is large, a correct vehicle speed Vv' corresponding to the position of the driven wheels $W_{FL}$ and $W_{FR}$ can be determined by finding the difference in speed between the front and rear wheels as the correction value ΔVv, and adding the correction value ΔVv to the follower wheel speed average value Vv.

Returning to FIG. 3, the driven-wheel speed average value Vw determined in the driven-wheel speed average value calculating means 21 and the vehicle speed Vv' determined in the vehicle speed calculating means 24 are inputted into a slip rate calculating means 25, where a slip rate for the driven wheels $W_{FL}$ and $W_{FR}$ is determined according to the following expression:

Slip Rate=$[(Vw-Vv')/Vv']\times 100$

If the slip rate of the driven wheels $W_{FL}$ and $W_{FR}$ exceeds a predetermined value, the electronic control unit U drives the pulse motor 7 to close the throttle valve 8, thereby reducing the output torque from the internal combustion engine E to prevent the excessive slipping of the drive wheels $W_{FL}$ and $W_{FR}$.

Figure 5:
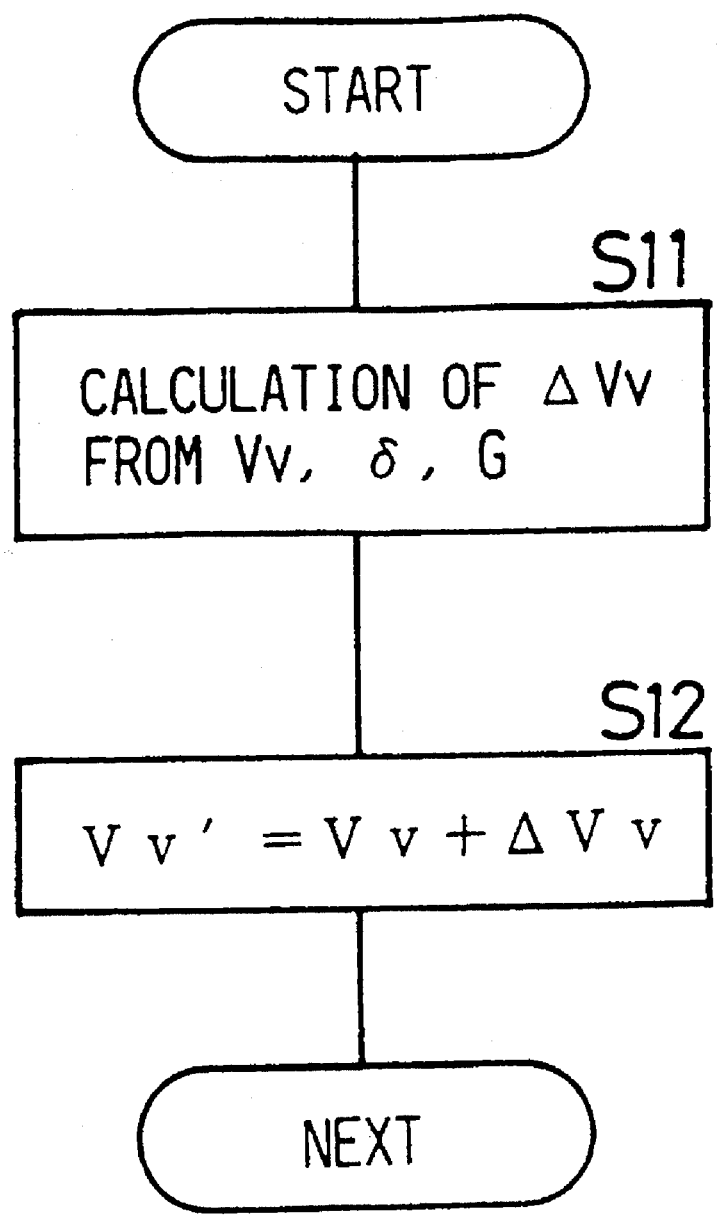
FIG. 5 is a flow chart similar to FIG. 4, but according to a second embodiment.
Figure 6:
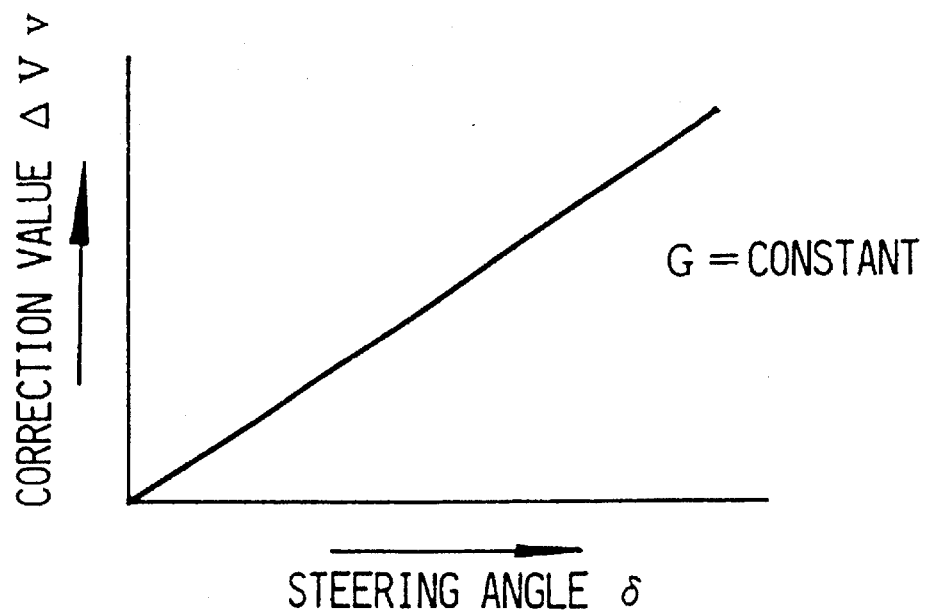
FIG. 6 is a graph illustrating the relationship between the steering angle δ and the correction value ΔVv.
Figure 7:
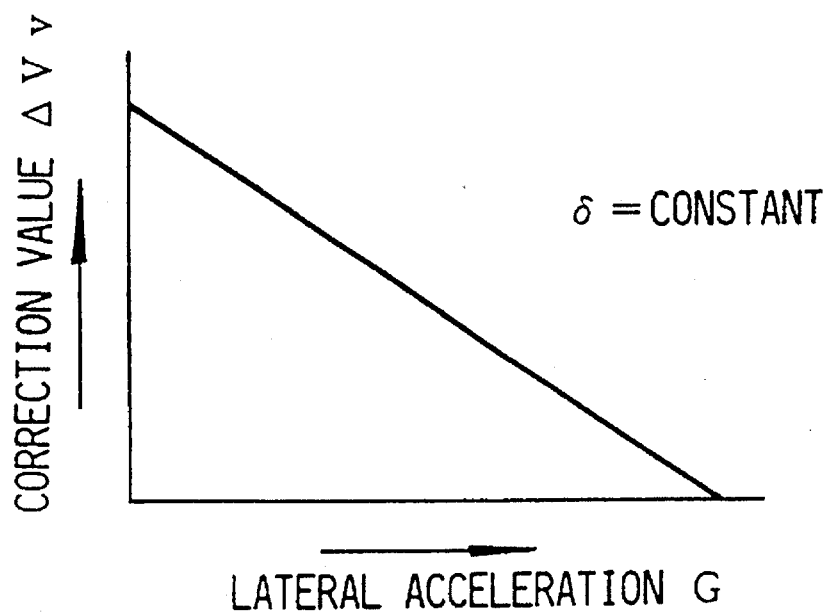
FIG. 7 is a graph illustrating the relationship between the lateral acceleration G and the correction value ΔVv.

FIGS. 5 to 7 illustrate a second embodiment of the present invention.

Figure 3:
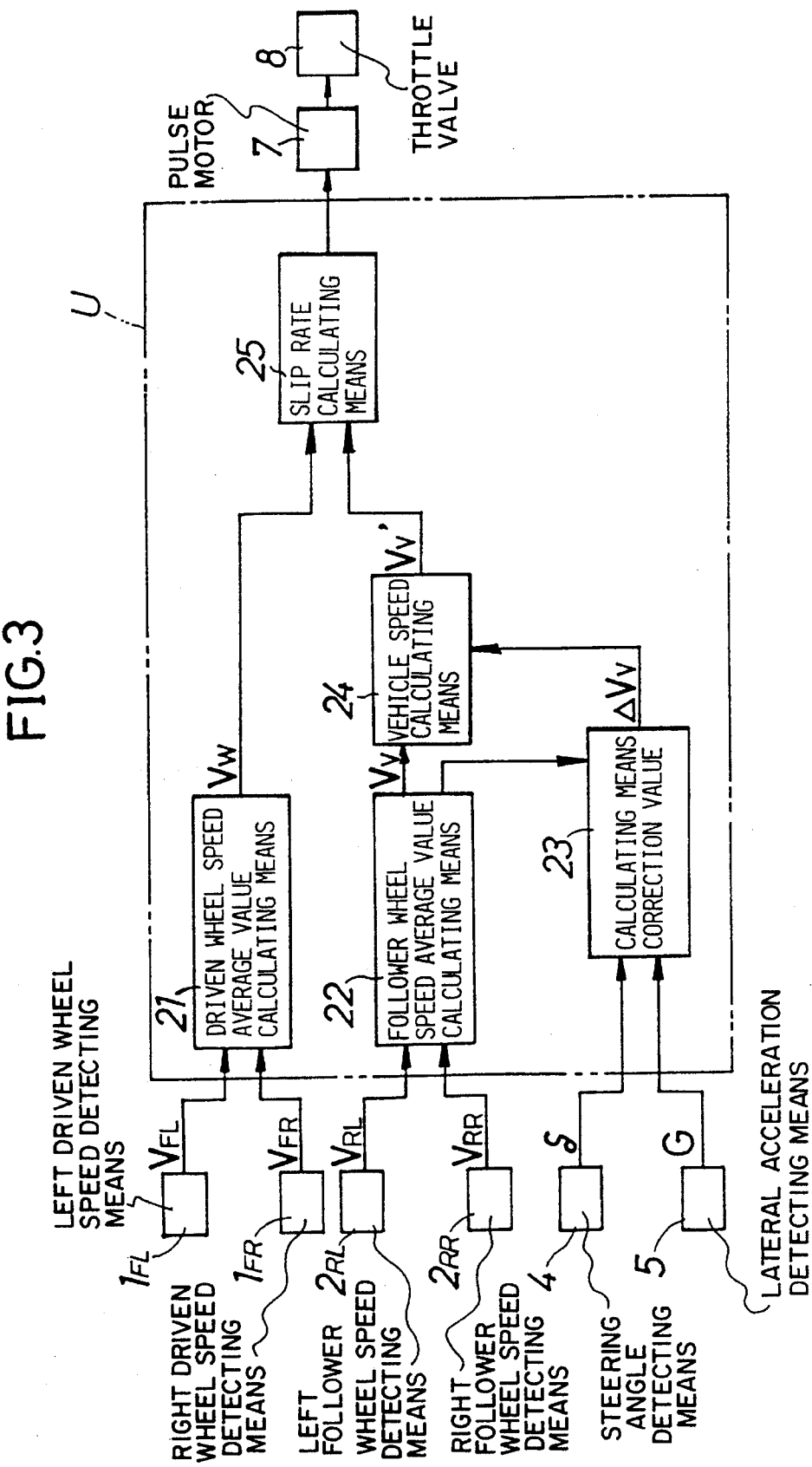
FIG. 3 is a block diagram illustrating a circuit arrangement of an electronic control unit used with a first embodiment of the present invention.

In this embodiment, the following processing is carried out in the correction value calculating means 23 and the vehicle speed calculating means 24 shown in FIG. 3. At a step S11, a correction value $\Delta Vv$ corresponding to a difference in speed between the front and rear wheels of the vehicle during turning of the vehicle is calculated on the basis of the follower wheel speed average value Vv determined in the follower wheel speed average value calculating means 22, the lateral acceleration G detected in the lateral acceleration detecting means 5 and the steering angle $\delta$ of the steering wheel 3 detected in the steering angle detecting means 4. More specifically, the relationship (see FIG. 6) between the steering angle $\delta$ and the correction value $\Delta Vv$ when the lateral acceleration G is constant, and the relationship (see FIG. 7) between the lateral acceleration G and the correction value $\Delta Vv$ when the steering angle $\delta$ is constant, have been previously stored as tables in the read only memory 12, and the correction value $\Delta Vv$ is determined from these tables and the follower wheel speed average value Vv. Then, at a step S12, a vehicle speed Vv' as a value representative of the left and right follower wheel speeds is determined by adding the correction value $\Delta Vv$ to the follower wheel speed average value Vv.

Figure 8:
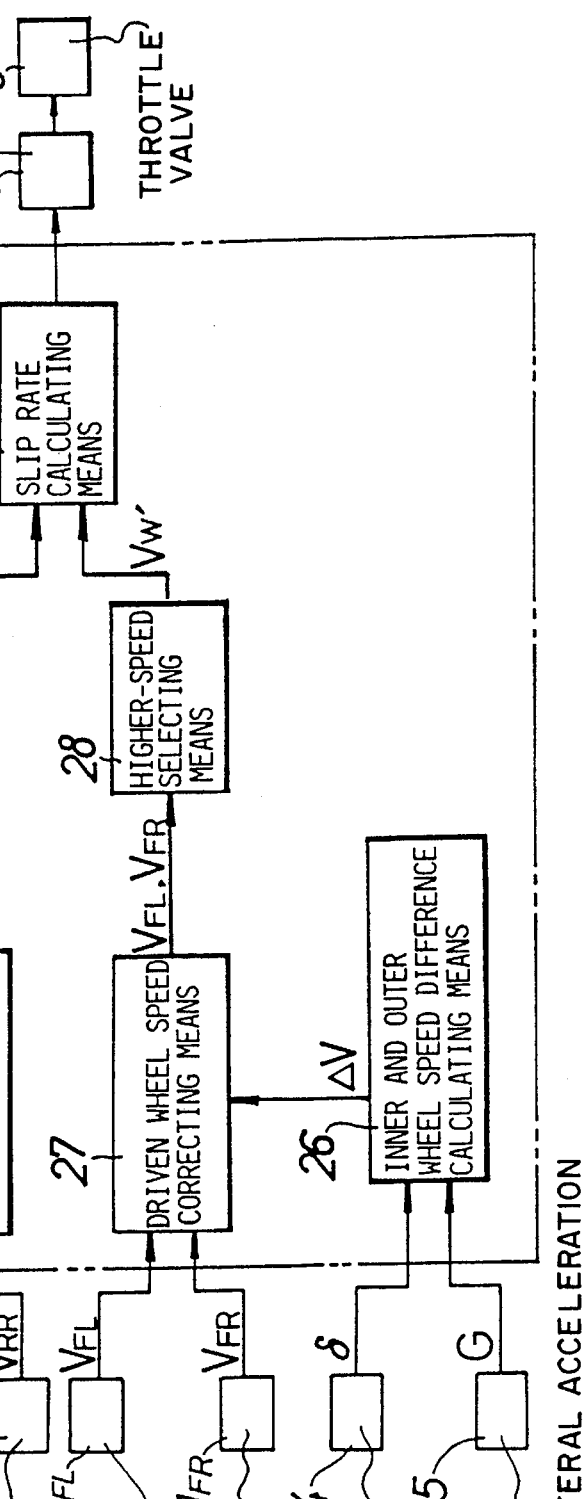
FIG. 8 is a block diagram illustrating a circuit arrangement of an electronic control unit used with a third embodiment of the present invention.
Figure 9:
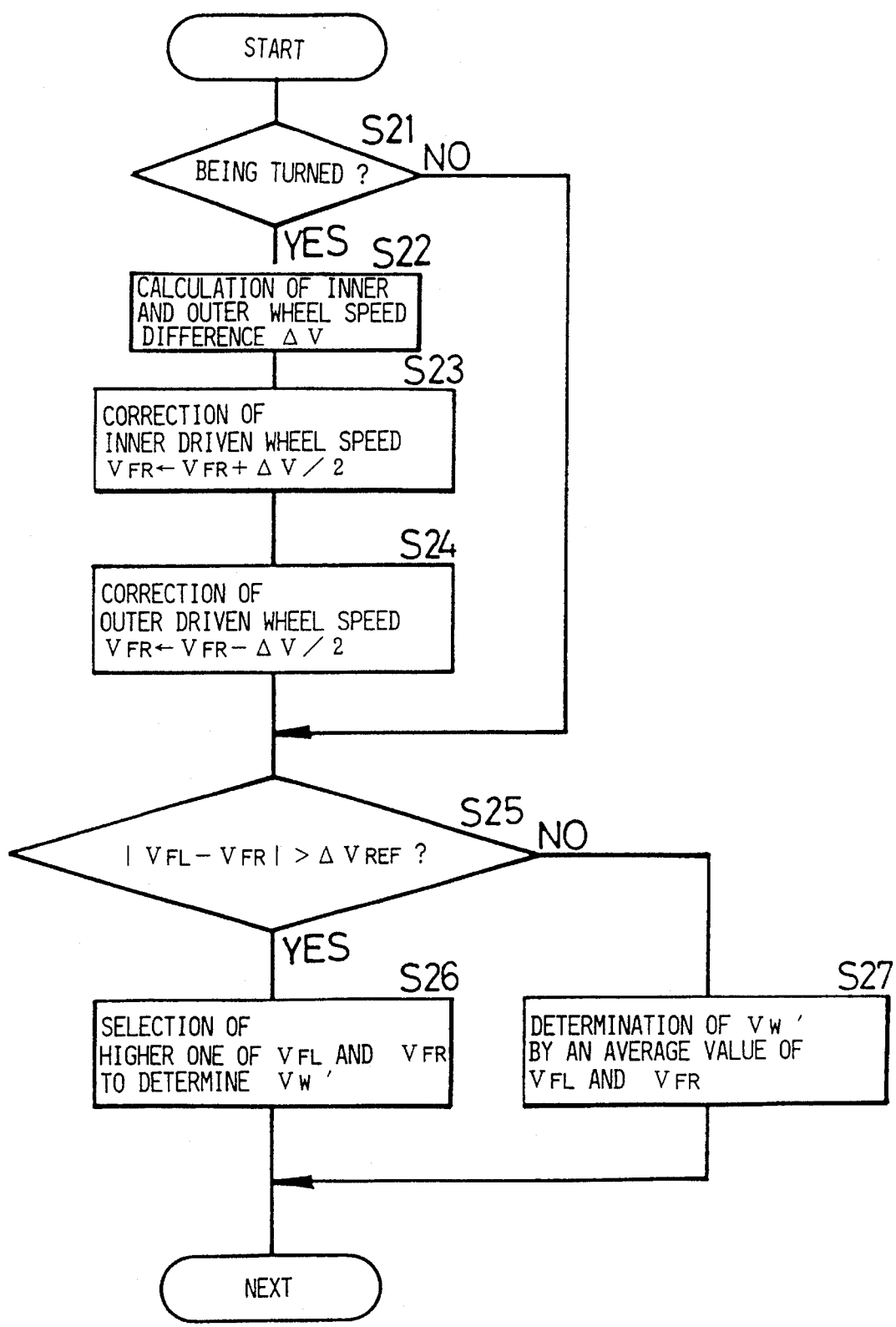
FIG. 9 is a flow chart for detecting driven wheel speeds.
Figure 10:
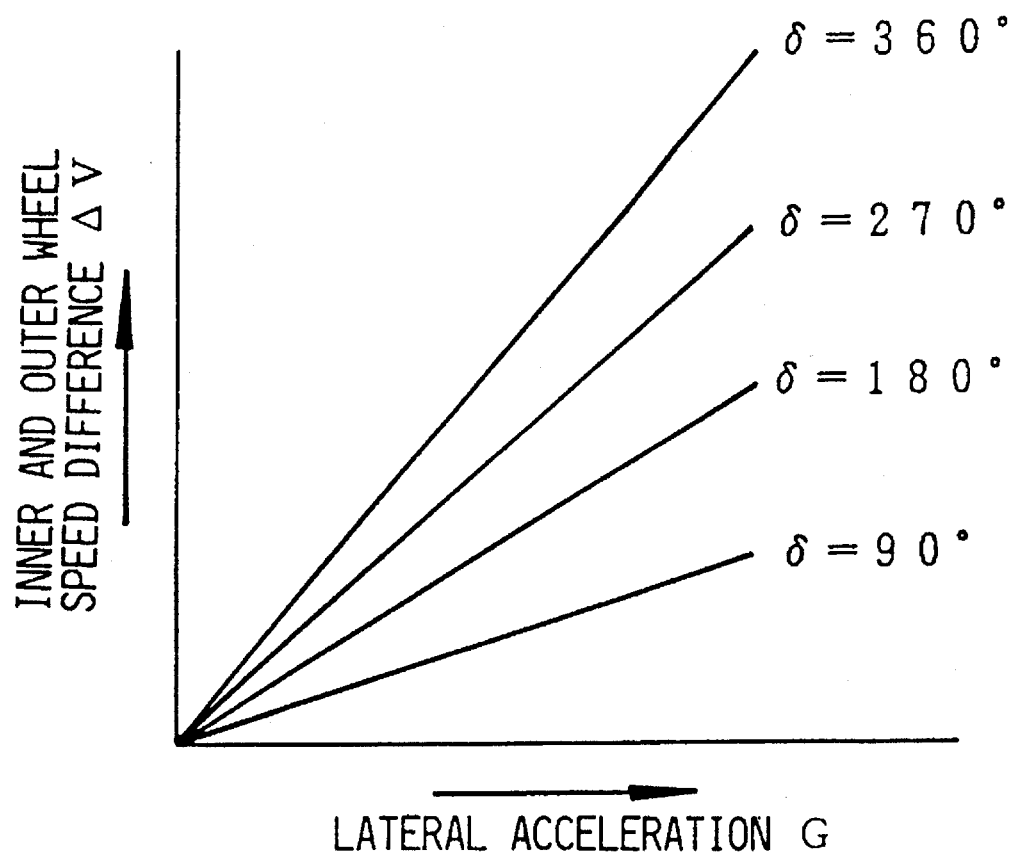
FIG. 10 is a graph illustrating the relationship between the lateral acceleration G and the inner and outer wheel speed difference ΔV.

FIGS. 8 to 10 illustrate a third embodiment of the present invention. An electronic control unit in this embodiment is partially different in arrangement from those in the previously described embodiments, and the same constructions as in the previously described embodiments are designated by the same reference characters and the description thereof is omitted herein.

FIG. 8 illustrates a circuit arrangement of the electronic control unit U in this embodiment.

A steering angle $\delta$ of the steering wheel 3 detected in the steering angle detecting means 4 and a lateral acceleration G detected in the lateral acceleration detecting means 5 are inputted into an inner and outer wheel speed difference calculating means 26, where a difference in speed between the driven wheel lying on the inner side and the driven wheel lying on the outer side during turning of the vehicle, i.e., an inner and outer wheel speed difference $\Delta V$ is calculated. Left and right driven-wheel speeds $V_{FL}$ and $V_{FR}$ detected in the driven-wheel speed detecting means $1_{FL}$ and $1_{FR}$ and the inner and outer wheel speed difference $\Delta V$ calculated in the inner and outer wheel speed difference calculating means 26 are inputted into a driven-wheel speed correcting means 27, where the left and right driven-wheel speeds $V_{FL}$ and $V_{FR}$ are corrected by the inner and outer wheel speed difference $\Delta V$. The corrected left and right driven-wheel speeds $V_{FL}$ and $V_{FR}$ are inputted into a higher-speed selecting means 28 where larger one of such corrected left and right driven-wheel speeds $V_{FL}$ and $V_{FR}$ is selected as a final driven-wheel speed Vw'. Here, the inner and outer wheel speed difference calculating means 26, the driven-wheel speed correcting means 27 and the higher-speed selecting means 28 constitute a correcting and calculating means for correcting the wheel speeds and calculating a value representative of the left and right wheel speeds.

The content of a program carried out in the inner and outer wheel speed difference calculating means 26, the driven-wheel speed correcting means 27 and the higher-speed selecting means 28 will be described below with reference to a flow chart shown in FIG. 9.

First, at a step S21, it is judged whether or not the vehicle is being turned, on the basis of the steering angle $\delta$ of the steering wheel 3 detected in the steering angle detecting means 4 and the lateral acceleration G detected in the lateral acceleration detecting means 5. This judgement is made by considering whether or not the steering angle $\delta$ is equal to or more than a predetermined value (e.g., 30°), or considering whether or not the lateral acceleration G is equal to or more than a predetermined value (e.g., 0.5 G). If it has been decided at the step S21 that the vehicle is being turned, an inner and outer wheel speed difference $\Delta V$ is found at a step S22. The inner and outer wheel speed differences $\Delta V$ have been previously stored in the table in correspondence to various values of steering angles $\delta$ and lateral accelerations G, as shown in FIG. 10.

Supposing that the vehicle is being turned, for example, clockwise, the driven-wheel speed $V_{FR}$ of the right driven wheel $W_{FR}$ lying on the inner side during turning of the vehicle is corrected at a step S24 by adding one half of the inner and outer wheel speed difference $\Delta V$ to such driven-wheel speed $V_{FR}$, and the driven-wheel speed $V_{FL}$ of the left driven wheel $W_{FL}$ lying on the outer side during the turning of the vehicle is corrected at a step S25 by subtracting one half of the inner and outer wheel speed difference $\Delta V$ from such driven-wheel speed $V_{FL}$. As a result, $\Delta V/2$ which is a speed decrement due to the turning of the vehicle is added to the speed $V_{FR}$ of the driven wheel $W_{FR}$ lying on the inner side during the turning, and $\Delta V/2$ which is a speed increment due to the turning of the vehicle is subtracted from the speed $V_{FL}$ of the driven wheel $W_{FL}$ lying on the outer side during the turning. Thus, both the driven-wheel speeds $V_{FL}$ and $V_{FR}$ are corrected to directly comparable values.

Then, an absolute value $|V_{FL}-V_{FR}|$ of a difference between the left and right driven-wheel speeds $V_{FL}$ and $V_{FR}$ after such correction, and a high select threshold value $\Delta V_{REF}$ (e.g., 1 km/hr) are compared with each other at a step S25. If the absolute value $|V_{FL}-V_{FR}|$ is larger than $\Delta V_{REF}$ a, larger one of the left and right driven-wheel speeds $V_{FL}$ and $V_{FR}$ after the correction, i.e., the speed of the driven wheel which has been actually slipped is selected as a value representative of the left and right driven-wheel speeds $V_{FL}$ and $V_{FR}$, i.e., as a final driven wheel speed Vw' at a step S26. In other words, in comparing the magnitudes of the left and right driven-wheel speeds $V_{FL}$ and $V_{FR}$ during turning of the vehicle, an influence of the inner and outer wheel speed difference $\Delta V$ due to the turning can be eliminated, and only the left and right wheel speed difference due to the slipping can be extracted, thereby determining a magnitude relationship. If the slip amount of the driven wheels $W_{FL}$ and $W_{FR}$ is small and the absolute value $|V_{FL}-V_{FR}|$ is smaller than the threshold value $\Delta V_{REF}$, an average value $(V_{FL}+V_{FR})/2$ of the driven-wheel speeds $V_{FL}$ and $V_{FR}$ after the correction is calculated and provided as a final driven wheel speed Vw' at a step S27.

If it has been decided at the step S21 that the vehicle is not being turned, the processing is advanced to the step S25. If a difference between the slip amounts of the left and right driven wheels $W_{FL}$ and $W_{FR}$ exceeds the threshold value $\Delta V_{REF}$ at the step S25, a final driven-wheel speed Vw' is determined at the step S26 by the selection of a higher one of the left and right driven wheels $W_{FL}$ and $W_{FR}$. If such difference is equal to or less than the threshold value $\Delta V_{REF}$, a final driven-wheel speed Vw' is determined by the above-described average value at the step S27.

Returning to FIG. 8, a slip rate of the driven wheels $W_{FL}$ and $W_{FR}$ is determined in the slip rate calculating means 25 on the basis of the follower wheel speed average value Vv determined in the follower wheel speed average value calculating means 21 and the driven wheel speed Vw determined in the higher-speed selecting means 28 according to the following expression:

Slip Rate=[(Vw'−Vv)/Vv]×100

If the slip rate of the driven wheels $W_{FL}$ and $W_{FR}$ exceeds the predetermined value, the electronic control unit U drives the pulse motor 7 to close the throttle valve 8, thereby reducing the output torque from the internal combustion engine E to prevent the excessive slipping of the driven wheels $W_{FL}$ and $W_{FR}$.

Although the embodiments of the present invention have been described in detail, it will be understood that the present invention is not intended to be limited to these embodiments, and various minor modifications in design can be made without departing from the spirit and scope of the invention defined in claims.

For example, although the front wheel drive vehicle having the front wheels as the driven wheels and the rear wheels as the follower wheels has been illustrated in the embodiments, the present invention is also applicable to a rear wheel drive vehicle having front wheels as follower wheels and rear wheels as driven wheels. In addition, the present invention is not limited to the traction control system and is also applicable to another use.

What is claimed is:

1. A wheel speed detecting device for a vehicle having an internal combustion engine with a throttle valve for controlling output torque, said wheel speed detecting device comprising:

an electronic control unit including at least one memory unit, a central processing unit, an input section, and an output section for controlling said throttle valve via a throttle valve driving means;

wheel speed detecting means for detecting at least a left follower wheel speed and a right follower wheel speed;

turning state detecting means for detecting a turning state of the vehicle; and correcting and calculating means contained in said central processing unit comprising a follower wheel speed average value calculating means for calculating a follower wheel speed average value as a function of said left follower wheel speed and said right follower wheel speed which are input to said input section of said electronic control unit from said wheel speed detecting means, a correction value calculating means for calculating a correction value for said follower wheel speed average value on the basis of an output from said turning state detecting means, and a vehicle speed calculating means for calculating a final wheel speed value as a function of said follower wheel speed average value and said correction value, said final wheel speed value being used to calculate a slip rate;

wherein whenever said slip rate exceeds a predetermined value said electronic control unit drives said throttle valve driving means for controlling said throttle valve to control output torque of said internal combustion engine.

2. A wheel speed detecting device for a vehicle according to claim 1, wherein said turning state detecting means comprises, at least, steering angle detecting means for detecting a steering angle of the vehicle, and lateral acceleration detecting means for detecting a lateral acceleration of the vehicle.

3. A wheel speed detecting device for a vehicle having an internal combustion engine with a throttle valve for controlling output torque, said wheel speed detecting device comprising:

an electronic control unit including at least one memory unit, a central processing unit, an input section, and an output section for controlling said throttle valve via a throttle valve driving means;

wheel speed detecting means for detecting left and right follower wheel speeds and left and right driven wheel speeds;

turning state detecting means for detecting a turning state of the vehicle; and correcting and calculating means contained in said central processing unit, comprising a follower wheel speed average value calculating means for calculating a follower wheel speed average value as a function of said left follower wheel speed and said right follower wheel speed which are input to said input section of said electronic control unit from said wheel speed detecting means, an inner and outer wheel speed difference calculating means for calculating an inner and outer wheel speed difference between the left and right driven wheel speeds on the basis of an output from said turning state detecting means which is input to said input section of said electronic control unit, driven-wheel speed correcting means for correcting said left and right driven wheel speeds on the basis of an output from said inner and outer wheel speed difference calculating means, respectively, and higher-speed select means for selecting a larger one of the left and right driven wheel speeds for calculating a final wheel speed when a difference between the left and right driven wheel speeds corrected by said driven-wheel speed correcting means exceeds a first predetermined value, said final wheel speed and said follower wheel speed average value being used to calculate a slip rate, wherein whenever said slip rate exceeds a second predetermined value said electronic control unit drives said throttle value driving means for controlling said throttle valve to control output torque of said internal combustion engine.

4. A wheel speed detecting device for a vehicle according to claim 3, wherein when said turning state detecting means does not detect the turning state of the vehicle, the correction by said driven-wheel speed correcting means is not carried out, and the left and right driven wheel speeds detected by said driven wheel speed detecting means are inputted directly into said higher-speed select means, and when the difference between the left and right driven wheel speeds exceeds the predetermined value, a larger one of said left and right driven wheel speeds is selected.

5. A wheel speed detecting device for a vehicle according to claims 1 or 3, wherein said throttle valve driving means comprises a pulse motor.

* * * * *